Feb. 9, 1965 L. L. SMITH 3,169,170

RECORDED MESSAGE SERVICE FOR TELEPHONE OPERATORS

Filed Oct. 8, 1959 3 Sheets-Sheet 1

INVENTOR.
LESTER L. SMITH

BY
C. A. Gulbrand [signature]

ATTY.

INVENTOR.
LESTER L. SMITH
BY C. A. Gulbrandsen
ATTY.

RECORDED MESSAGE SERVICE FOR TELEPHONE OPERATORS

Filed Oct. 8, 1959 3 Sheets-Sheet 3

INVENTOR.
LESTER L. SMITH
BY C. A. Gulbrandsen
ATTY.

3,169,170

RECORDED MESSAGE SERVICE FOR TELEPHONE OPERATORS

Lester L. Smith, McHenry, Ill., assignor to Automatic Electric Laboratories, Inc., a corporation of Delaware Filed Oct. 8, 1959, Ser. No. 845,187
2 Claims. (Cl. 179—27)

The present invention relates generally to automatic telephone systems, and is particularly directed to the use of recorded verbal messages in such systems for announcing to an operator, for example, that a call which has been extended to her position is from a paystation or a restricted station, or from some other location requiring special handling.

In the earlier automatic telephone systems, tone signals of various kinds such as dial-tone, busy-tone, ringback tone and the like were employed to give information to the subscribers as to the status of their call. As new services appeared, new signals were required, each of which had to be different and easily distinguished from all of the others. As signals multiplied, the danger of confusion increased. It also became necessary in certain special situations such as wrong dialling for example, to switch the call through to an intercept operator, who would then give the caller the proper instructions.

More recently, means have been devised whereby spoken messages, pre-recorded on a recorder-announcer have been transmitted automatically from a central office to a subscriber line, to provide the information or the instructions previously provided by tone signals, or by special service operators.

An example of such an application may be seen in U.S. Patent No. 2,824,907 issued to E. S. Peterson on February 25, 1958, wherein a multi-channel, drum-type magnetic announcer was used to give any one of several recorded messages to a subscriber in accordance with any one of several possible service requirements. Since a single machine was thus made available for a number of such uses, this proved an efficient and economical solution to the problem.

A similar problem arises with toll and special service operators, who are normally also required to listen for and recognize various types of tone signals in their work.

It is the main object of the present invention to employ such an announcing machine also to give spoken messages to a toll or special service operator to replace at least some of the tone signals previously employed. Examples of such use would be to identify calls from paystations or other restricted stations, intercepted calls, alarm calls, and the like.

A feature of the invention is the provision of a class-of-call detector circuit which is used only momentarily on each call, and is capable of serving a plurality of operator's trunks.

Another feature of the invention is the provision of a small amount of control equipment in each operator's trunk for controlling the announcer in response to a signal from the detector circuit.

Another feature of the invention is the use of a voice-controlled timer which permits the use of a short message on an announcer arranged for longer messages, without undue repetition or lost time between available messages.

Other objects and features of the invention will become apparent upon perusal of the following description and consideration of the appended drawings, in which:

FIGURE 1 represents part of a combined-line-and-recording (C.L.R.) trunk to an operator, and modified to meet the requirements of the invention;

FIGURE 2, on the left, shows another portion of the same trunk, and on the right, a tone detector 20 and a message timer 25, enclosed in broken line rectangles;

Figure 1:
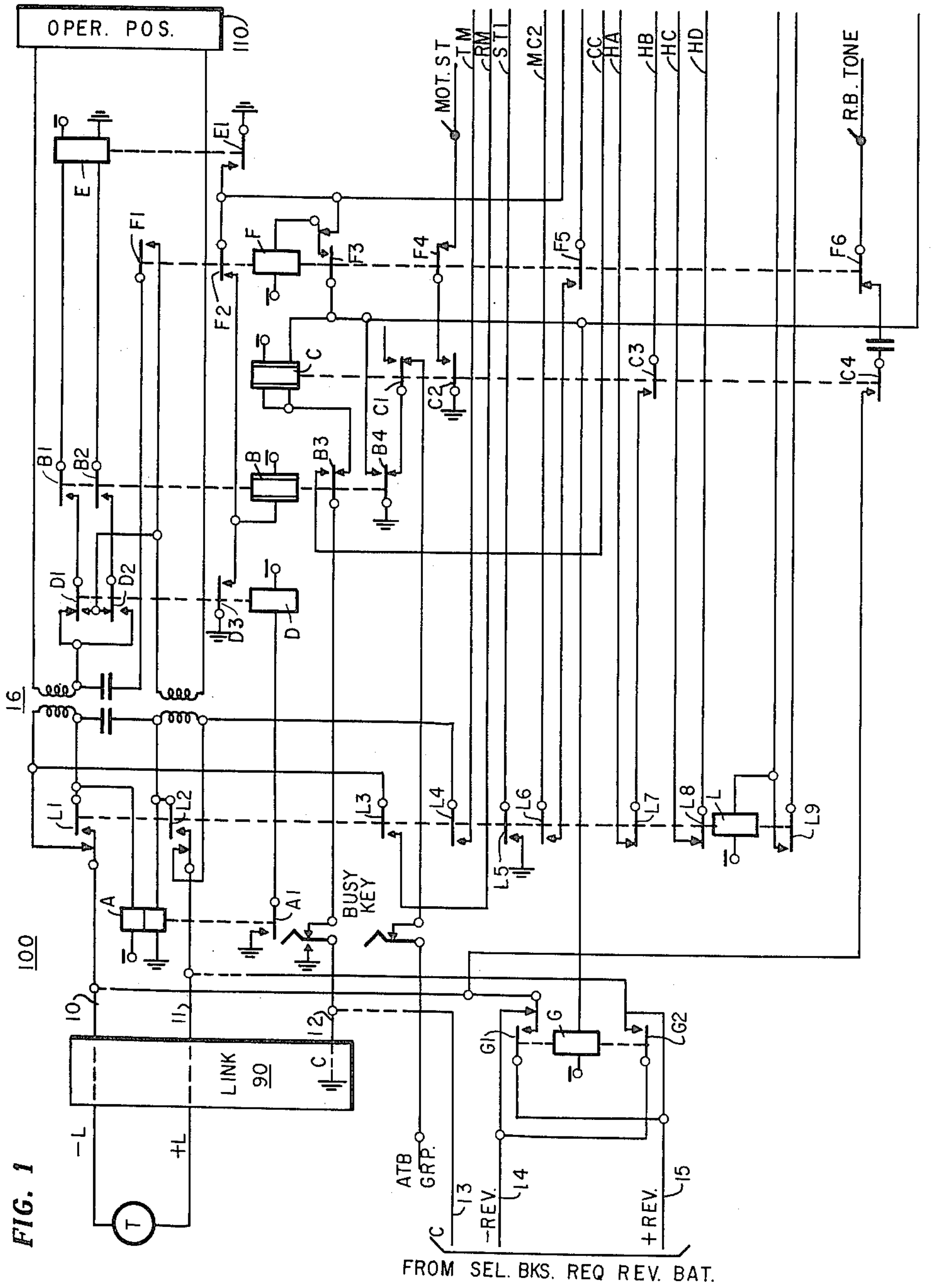
Figure 2:
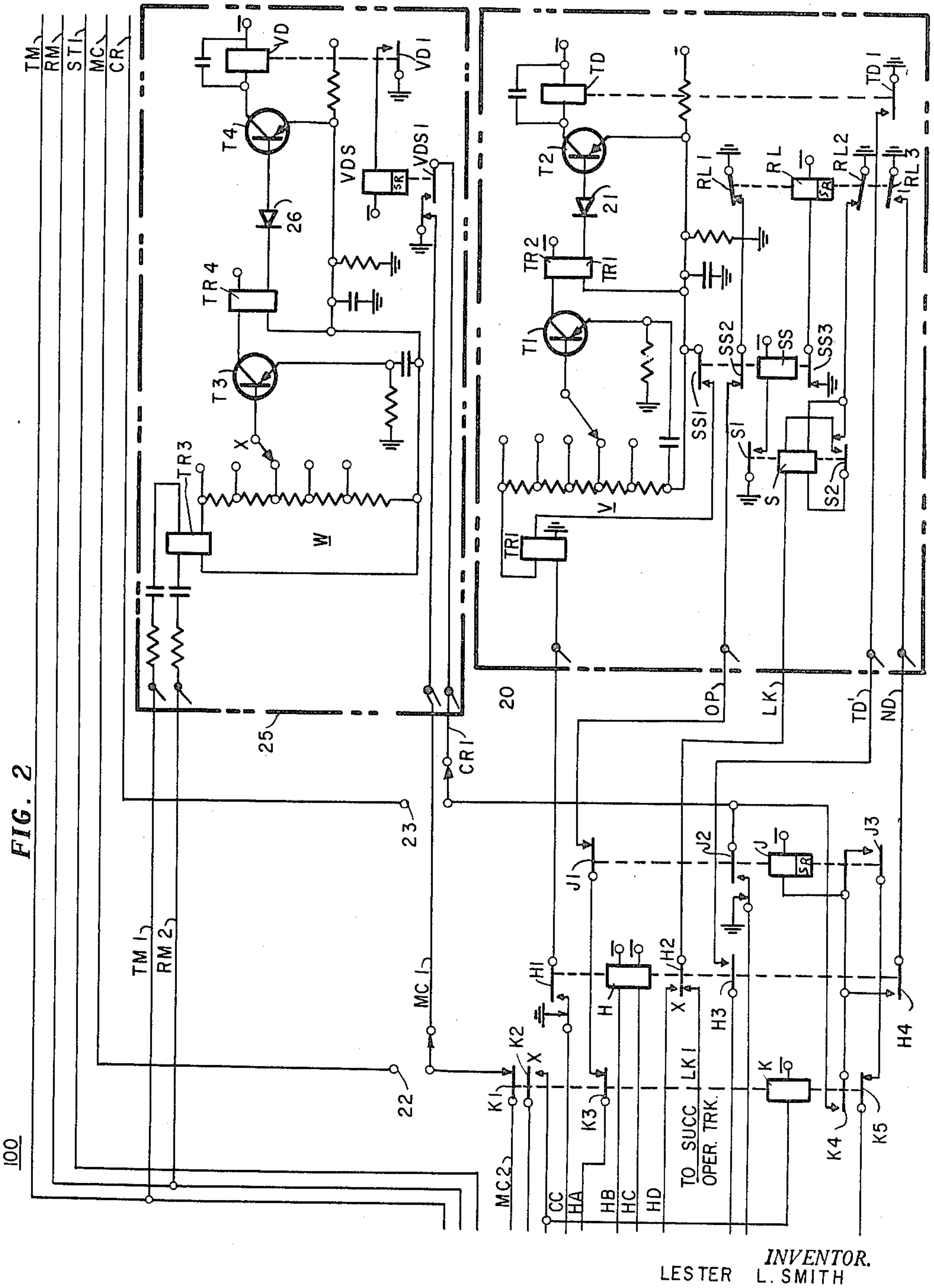

The trunk circuit 100 of FIGURES 1 and 2 consists essentially of a small group of relays controlling a speech circuit extending through a repeating coil 16 to an operator's position 110. This trunk has the usual battery feed relays A and E on either side of the repeating coil, and is arranged for seizure either from a selector level not requiring battery reversal, or from one requiring battery reversal. In the first instance, it would be seized over the wires 10, 11, 12, and in the second instance over the wires 13, 14, 15. The automatic switch train involved may be of almost any type, but it may be assumed to be of the well-known Strowger type. A finder-selector link 90 for such a system, and which is accessible to a plurality of subscriber stations such as T, is indicated diagrammaticaly at the upper left in FIGURE 1. No connector switches are shown.

The tone detection circuit 20 of FIGURE 2 consists essentially of two induction coils TR1 and TR2, a variable resistance network V, a pair of transitsors T1 and T2 connected in cascade as the two-stage amplifier, a rectifying diode 21, and four relays. This unit is common to a plurality of trunks, but is operatively associated with only one of these trunks at a time. It is seized momentarily on all incoming calls, but is effectively operated only if a tone is present on the test conductor of the trunk involved. The relay RL is normally operated.

The electronic timer 25 of FIGURE 2 includes a two stage transistor amplifier like the tone detector 20, but has only two relays. It is connected to a pair of message leads coming from the associated announcer, and is operated whenever a message from the announcer is present in these conductors.

Figure 3:
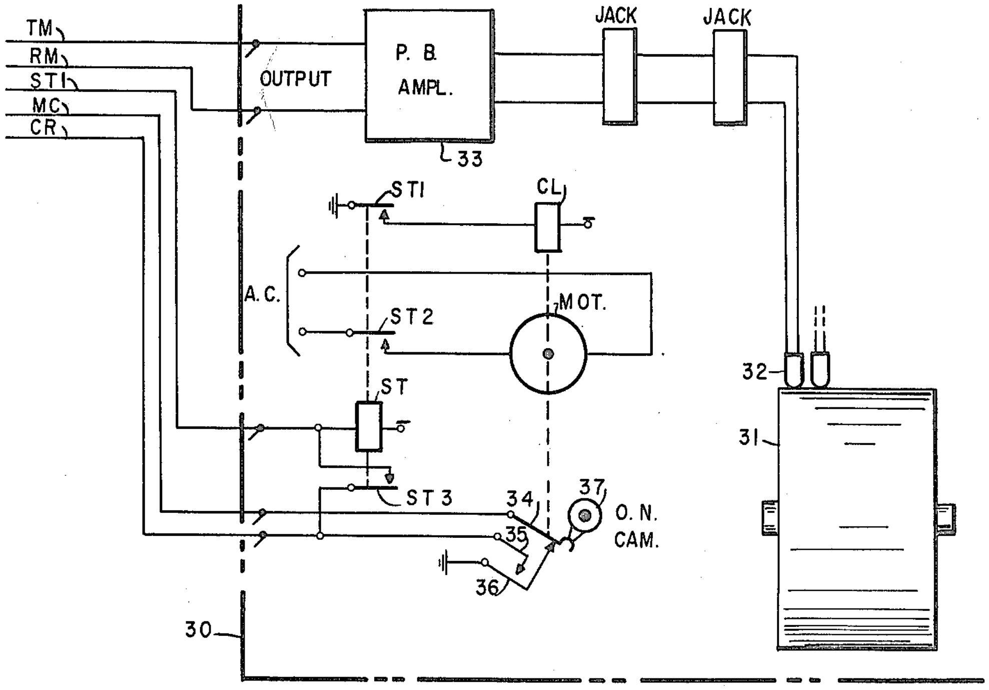
FIGURE 3 shows the essential elements of a plural-channel magnetic announcer 30 suitable for use in the invention.
Figure 4:
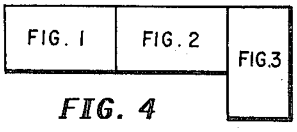
FIGURE 4 shows how the three foregoing figures should be joined to form a comprehensive whole.

The recorder announcer 30 of FIGURE 3 is a drum type magnetic machine, having a drum 31 and a plurality of pick-up heads 32, each connected to a playback amplifier such as 33. Also illustrated are a start relay ST, a drive motor MOT, a clutch magnet CL, and an off-normal cam 37 controlling a set of make-before-break spring contacts 34, 35, 36. The drum 31 is arranged to make one revolution and stop each time a start signal is received, and at each revolution the pickup heads trace a complete circuit along individual sound tracks, or channels around the periphery of the drum. In the present instance, it will be assumed, by way of example, that the maximum length of message possible in one revolution of the drum is twelve seconds, and that the message in the first channel is only two or three seconds long, and is repeated severel times in the first sound track.

The operation of this circuit is as follows: When a call is switched through to the trunk 100 from a selector bank over the wires 10, 11, 12, for example, relay A operates over the line loop including speech conductors 10 and 11 and the left windings of repeating coil 16. Relay C also operates from the usual ground forwarded over the test conductor 12.

Relay C upon operating, at contacts C2 grounds the start lead to the ringing and tone equipment of the exchange, at contacts C4 connects ringback tone to the calling line, and at contacts C3 completes a circuit to the upper winding of relay H, from ground via break contacts L7, K3, J1, SS2, and make contacts RL1. Relay A operates relays D and B in obvious manner, thereby closing a local loop from relay E to conductors 17 and 18 leading to the operator, who is thereby signalled by the lighting of a call lamp in known manner. Relay B also, at contacts B4 closes a locking circuit for relay C, and at contacts B3 disconnects the test conductor 12 from relay C, and connects it to contacts H1 via wire CC.

Meanwhile relay H, having operated over its upper winding, connects the tone detection circuit 20 to the trunk circuit 100, and at its make-first contacts H2 closes a circuit for its lower winding in series with relay S which operates, from ground at make contacts RL2 extended over the HD and HC conductors and break contacts L8. Relay S operates SS, which closes the input circuit to the transistor amplifier at make contacts SS1, and at break contacts SS2 opens the circuit to the upper winding of relay H, now held over its lower winding. Relay SS also, at its break contacts SS3 opens the circuit of slow-release relay RL.

With the relays B and H operated, it will be seen that the incoming test conductor 12 is extended over the wire CC and make contacts H1 to the lower winding of induction coil TR1. If the call is from a regular subscriber there will be no special signal on the test lead 12, other than the usual battery and ground markings, and the tone relay TD will not be affected. Relay RL therefore releases, after a brief delay, and will close its break contacts RL3 to cause the operation of relay J, which locks to make contacts B4, while make contacts RL1 and RL2 open, to cause the release of relays S and H. Relay SS then releases, and causes the reoperation of relay RL. The detection circuit 20 is now disconnected from the trunk circuit 100, and is made available to the next trunk of the group via break contacts H2 and wire LK1.

When the operator answers, relay E is operated over the speech conductors 17, 18. Relay E operates F which locks to make contacts B4. Relay F disconnects the ring-back tone, and at contacts F1 completes the speech connection to the operator, through the repeating coil 16. When the calling party hangs up, relays A, D, B, C, and J release, and the operator is signalled by the release of B to release her end of the connection. When this is done, relays E and F release and the trunk circuit is again normal.

If however, the call is from a paystation for example, a tone signal will be present on the test conductor 12 as soon as the selector switches through.

When therefore, the trunk relays B and H operate in the manner already described, this tone signal is forwarded over make contacts B3 and H1 to the lower winding of induction coil TR1. Relays S and SS then operate as before and the latter disconnects relay RL and closes a circuit for the upper winding of coil TR1. The tone in the lower winding of TR1 thereupon passes by induction into the upper winding, is amplified by transistor T1, passes to the upper winding of induction coil TR2, is induced into the lower winding of TR2, is rectified by the diode 21, amplified again by the transistor T2, and finally causes the operation of the relay TD.

Tone relay TD thereupon closes a circuit to trunk relay L through contacts TD1 and H3. Relay L operates in this circuit and at contacts L9 locks to ground at back contacts J2. Relay L also, at contacts L1 and L2 disconnects the calling party's loop from the left windings of the repeating coil 16, while holding relay A over the said loop, at contacts L3 and L4 connects the left side of the repeating coil to the message leads TM and RM from the announcer, at contacts L5 grounds the announcer start conductor ST1, at make contacts L6 prepares a circuit for relay K, and at break contacts L7 and L8 opens both windings of relay H. Relay H thereupon releases quickly, and at contacts H1 disconnects the tone from TR1, thereby causing the release of tone relay TD. Relays S and SS likewise release, and reclose the circuit to relay RL before the latter can release. The tone detector is now again normal, and ready for seizure by another trunk.

Meanwhile, responsive to the start ground on wire ST1 from make contacts L5, start relay ST in the announcer 30 of FIGURE 3 operates, and closes obvious circuits to the clutch magnet CL and the drive motor MOT. The drum 31 now begins to rotate, and the off-normal cam 37 shifts the cam contact ground from the MC lead to the CR lead, to lock up the start relay. The head 32 now begins to pick up the repeated identical messages recorded in the associated sound track on the drum. As each message passes under the head 32, the latter transmits a reproduction thereof through the playback amplifier 33 and the speech conductors TM, RM to the repeating coil 16 of the trunk 100, and to the induction coil TR3 of the timer circuit 25 in parallel.

The voice currents thus passing through the coil TR3 are transferred by induction into its lower winding, are amplified by transistor T3, are passed by induction into the lower winding of coil TR4, rectified by diode 26, are re-amplified by transistor T4, and finally serve to operate voice relay VD. Relay VD in turn operates relay VDS, and the latter disconnects the ground which is normally on lead MC1 from contacts VDS1, and transfers it to lead CR1. Since the relay VDS is made slow-to-release as by the use of a copper slug on the core, it will hold during possible chattering by relay VD, but it will release during the intervals between messages, and will restore the ground to the MC1 lead.

When the operator answers, relays E and F operate as before, and the latter again locks to contacts B4, and closes its make contacts F1 and F5. If relay VDS in the timer 25 is normal at this time, indicating a silent interval between two successive repetitions of the message, ground from back contacts VDS1 will be on lead MC1 and will operate relay K, by way of break contacts K1 and make contacts L6 and F5.

Relay K upon operating, at its preliminary make contacts K2 locks to ground at make contacts E1. Relay K also at break contacts K1 opens the MC1 lead, at break contacts K3 further opens the circuit to relay H, at make contacts K4 prepares a circuit for relay J, and at break contacts K5 opens a locking circuit to J.

The next message in the first sound track of the announcer is then passed to the operator via the pickup head 32, the amplifier 33, the wires TM and RM, make contacts L3, L4, repeating coil 16 and wires 17 and 18. The operator upon hearing the message, knows immediately what type of call she is answering. This message is, of course, not heard by the calling party, due to the open back contacts L1 and L2.

Relay VD in the timer also operated from the speech signals at the start of the message and operated VDS. Relay VDS in turn removed its ground from lead MC1, but without effect on relay K now locked to contacts E1, so that when VDS then grounds lead CR1 relay J operates, via make contacts K4. Relay J thereupon, at break contacts J1 opens another point in the operate circuit to relay H and at make contacts J2 locks relay L also, to the ground on lead CR1.

When therefore the end of the message is reached, and the relays VD and VDS release, contacts VDS1 remove the ground from the CR1 conductor, thereby opening the circuits to relays J and L. Relay L releases quickly and at contacts L1 and L2 disconnects the message leads TM and RM from the repeating coil 16, and completes a speech connection between the calling party and the operator through the same repeating coil 16.

Relay L also, at its contacts L5 removes its ground from the announced start lead ST, at contacts L9 disconnects its own locking circuit, at contacts L7, L8 prepares the circuits to relay H, and at contacts L6 opens the operate circuit to relay K. Relay K is not affected however, since it is still locked through its own contacts K2 to the ground at make contacts E1. This prevents the reoperation of relay H at this time. Slow-to-release relay J then releases after a brief delay period.

If there are no other incoming calls in process, the announcer will stop at the end of its cycle, responsive to the aforesaid removal of ground from its start lead, when its off-normal cam 37 disconnects its ground from the locking springs ST3. Start relay ST is thereby caused to release, opening the clutch and motor circuits. If however, ground from another trunk is on the lead ST when the announcer reaches the home position, it will continue to run, and the voice relay VD will continue to operate and release as the messages succeed one another. The same thing will occur if the operator should fail to answer during the first cycle on the present call, since ground will be maintained on the start lead by relay L.

If the operator, instead of answering during a silent period as in the foregoing, should answer while a message is present in the message wires TM, RM, the relays VD and VDS will be operated at the time as previously explained, and as a result there will be no ground on lead MC1. Consequently relay K fails to operate when relay F operates, since there is no ground at contacts F5. At the end of the message however, VDS replaces the ground on MC1, and relay K operates, enabling relay J to operate as before at the start of the next message, when relay VDS again grounds lead CR1. In such case the operator may hear the last syllables of the first message, but will hear all of the second message.

It will be apparent that other groups of trunks to other operators such as special service operators of one kind or another, could be served in this manner by the same announcer, in response to special signals received over the test or extra control wires of the selectors, as the case might be. These signals would be extended to a different detector for each group of trunks, and would cause a message from one of the other sound tracks to be relayed to the answering operator, in the manner described. Separate timers would also be required and the signals could be special direct current signals or tone signals, as necessary or as preferred. The use of direct current signals would require only a minor and obvious modification of the detector 20.

In case all of the messages on the announcer were of the same length, or if there were no repetitions of the message in the sound track, the timer 25 would not be required, and the MC and CR leads from the recorder would be connected to the trunk in their stead, at the terminals 22 and 23. The wires TM1, RM1, MC1, CR1 would of course no longer be present.

What is claimed is:

1. In a telephone system, a plurality of trunk circuits leading to an operator's position, means for extending a connection to one of said trunk circuits over either of two paths, means in one of said paths for applying a tone signal to the trunk circuit whenever a connection is extended thereover to the trunk, a tone detector, a timing device and a message announcer each common to said plurality of trunk circuits, means for temporarily associating said detector with a trunk circuit whenever a connection is extended thereto, said tone detector operated only when said tone signal is present on a connection for starting said message announcer and temporarily connecting it to said trunk circuit to transmit a message to the operator indicating that the connection is over said one path, said message also transmitted to said timing device, said timing device also operated, in response to said message, to maintain said common devices connected to said trunk circuit only until the message is completed after the operator has answered the call.

2. In a telephone system, a plurality of trunk circuits leading to an operator's position, means for extending connections to one of said trunk circuits from different lines, means associated with certain of said lines for applying a tone signal to said trunk circuit to identify the type of line, a message recorder having voice messages recorded thereon, a tone detector and a timer both common to said trunk circuits, means responsive to the extension of any connection to one of said trunk circuits for momentarily connecting said tone detector thereto, means in said tone detector operated only when said tone signal is present on said connection for starting said message recorder and connecting it to said trunk circuit and for disconnecting said tone detector from the trunk circuit, and means jointly controlled by said operator and by said timer for maintaining said recorder connected to said trunk circuit until a message is completely transmitted by said recorder and then disconnecting the recorder and timer from the trunk circuit.

References Cited by the Examiner

UNITED STATES PATENTS

| | | | |
|---|---|---|---|
| 2,504,959 | 4/50 | Borel et al. | 179—18 |
| 2,542,999 | 2/51 | Deakin | 179—18 |
| 2,920,147 | 1/60 | Sellers | 179—6 X |
| 2,946,852 | 7/60 | Brown et al. | 179—6 |

ROBERT H. ROSE, *Primary Examiner.*

WALTER L. LYNDE, *Examiner.*